(12) United States Patent
Kompe et al.

(10) Patent No.: US 6,999,929 B2
(45) Date of Patent: Feb. 14, 2006

(54) RECOGNIZING SPEECH BY SELECTIVELY CANCELING MODEL FUNCTION MIXTURE COMPONENTS

(75) Inventors: Ralf Kompe, Fellbach (DE); Silke Goronzy, Fellbach-Schmiden (DE)

(73) Assignee: Sony International (Europe) GmbH, Berlin (DE)

( * ) Notice: Subject to any disclaimer, the term of this patent is extended or adjusted under 35 U.S.C. 154(b) by 680 days.

(21) Appl. No.: 09/947,109

(22) Filed: Sep. 5, 2001

(65) Prior Publication Data

US 2002/0046024 A1    Apr. 18, 2002

(30) Foreign Application Priority Data

Sep. 6, 2000   (EP)   ................................. 00119278

(51) Int. Cl.
G10L 15/20   (2006.01)
(52) U.S. Cl. ........................ 704/255; 704/251
(58) Field of Classification Search ............ 704/255, 704/266, 256, 236, 231, 234, 233, 251, 242, 704/270, 270.1, 235; 381/43; 382/224
See application file for complete search history.

(56) References Cited

U.S. PATENT DOCUMENTS

| | | | | |
|---|---|---|---|---|
| 5,027,406 A | * | 6/1991 | Roberts et al. | 704/244 |
| 6,163,768 A | * | 12/2000 | Sherwood et al. | 704/235 |
| 6,404,925 B1 | * | 6/2002 | Foote et al. | 382/224 |
| 6,882,972 B1 | * | 4/2005 | Kompe et al. | 704/255 |

FOREIGN PATENT DOCUMENTS

WO   WO 95 09416   4/1995

OTHER PUBLICATIONS

Kosaka T et al.: "Rapid Speaker Adaptation Using Speaker-Mixture Allophone Models Applied to Speaker-Independent Speech Recognition" ICASSP-93. 1993 IEEE International Conference on Acoustics, Speech, and Signal Processing (Cat. No. 92CH3252-4), Proceedings of ICASSP '93, Minneapolis, MN, USA, Apr. 27-30, 1993, pp. 570-573, vol. 2, XP002158973, no day.

McMichael D W: "Bayesian Growing and Pruning Strategies for Map-Optimal Estimation of Gaussian Mixture Models" Fourth International Conference on 'Artificial Neural Networks' (Conf. Publ. No. 409), Proceedings of 4th International Conference on Artificial Neural Networks (Conf. Publ. No. 409) Cambridge, UK, Jun. 26-28, 1995, pp. 364-368, XP002158976, no day.

Clarkson P R et al: "Language Model Adaptation Using Mixtures and an Exponentially Decaying Cache" 1997 IEEE International Conference on Acoustics, Speech, and Signal Processing (Cat. No. 97CB36052), 1997 IEEE International Conference on Acoustics, Speech, and Signal Processing, Munich, Germany, Apr. 21-24, 1997, pp. 799-802, vol. 2, XP002158977, no day.

* cited by examiner

*Primary Examiner*—Susan McFadden
(74) *Attorney, Agent, or Firm*—Frommer Lawrence & Haug LLP; William S. Frommer; Samuel S. Lee

(57) ABSTRACT

A method for recognizing speech is proposed wherein the process of recognition is started using the starting acoustic model (SAM) and wherein the current acoustic model (CAM) is modified by removing or cancelling model function mixture components ($MFM_{jk}$) which are negligible for the description of the speaking behavior and quality of the current speaker. Therefore, the size of the acoustic model (SAM, CAM) is reduced by adaptation to the current speaker enabling fast performance and increased recognition efficiency.

10 Claims, 1 Drawing Sheet

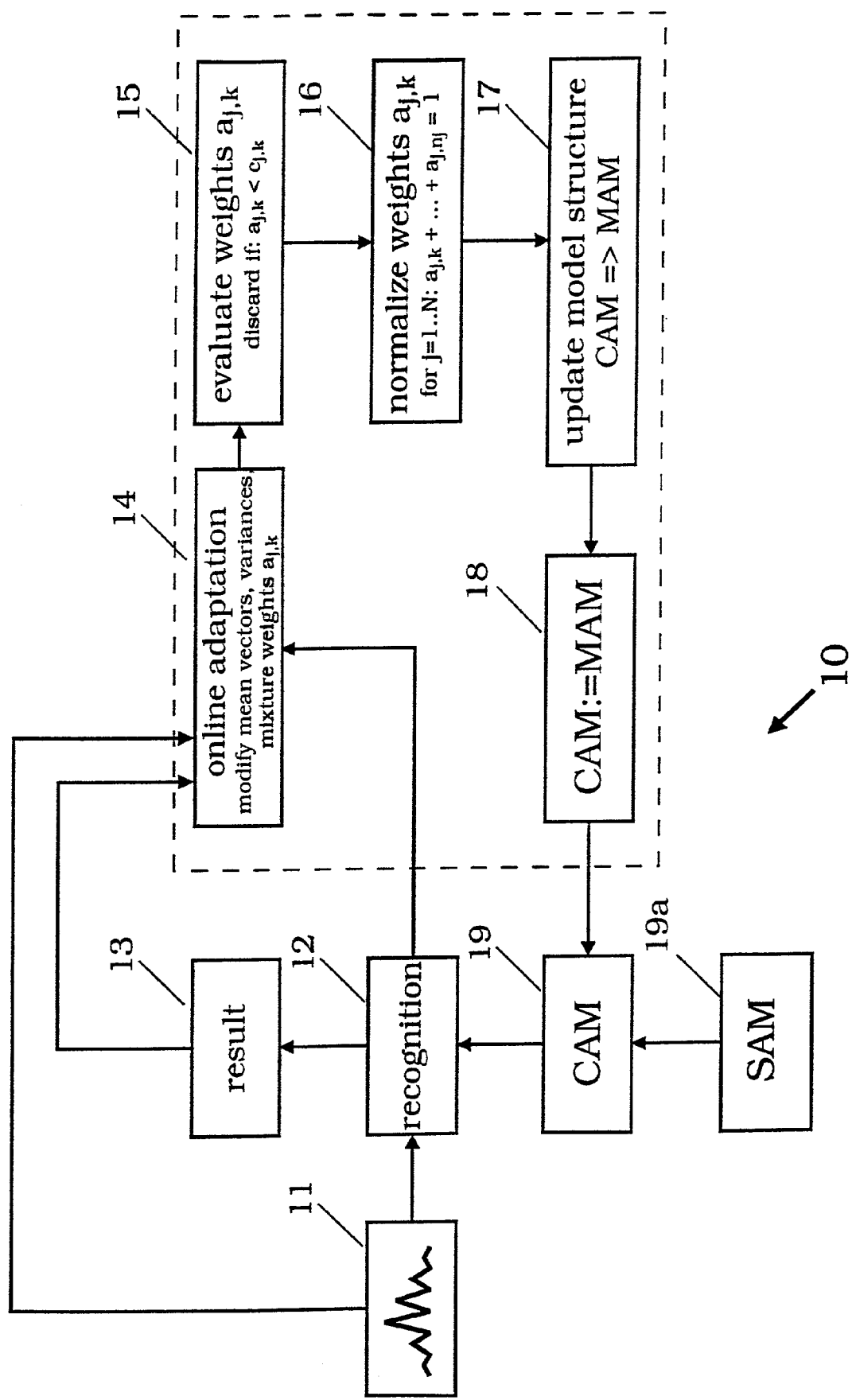

RECOGNIZING SPEECH BY SELECTIVELY CANCELING MODEL FUNCTION MIXTURE COMPONENTS

BACKGROUND

The present invention relates to a method for recognizing speech according to the preamble of claim 1, and in particular to a method for recognizing speech, whereby through speaker adaptation the number of model function mixtures used in an acoustic model is reduced and more particular to the reduction of the number of Gaussian mixtures in a speaker adaptive HMM-based speech recognition system.

Methods for automatic speech recognition become more and more important in these days. A particular problem in conventional methods for recognizing speech is that contrary goals have to be achieved simultaneously. On the one hand, the methods and devices should be as flexible as possible so as to deal with a large variety of speaking behavior, in particular with a variety of pronunciations, accents, dialects or the like. On the other hand, however, methods and devices for recognizing speech should be small to be easy implemented, to have a fast performance and high recognition efficiency, in particular at low cost.

Prior art methods for recognizing speech use speaker adaptation methods to transform an underlying acoustic model to better fit to the acoustic properties and the speaking behavior of a current or specific speaker. The basis for each acoustic model is essentially a set of model function mixtures. Many model function mixtures are needed to cover the large variety and variability of acoustical behavior in particular with respect to phones, phonemes, subword units, syllables, words or the like. In conventional methods for recognizing speech, a current acoustic model is adapted by changing at least in part the contributions of model function mixture components of model function mixtures during the process of recognition in particular based on at least one recognition result already obtained.

A major drawback of these conventional speaker adaptation methods for recognizing speech is that these models indeed employ a very large number of model function mixtures and model function mixture components. Therefore, these common methods for recognizing speech have to perform an equivalent large number of checks, comparisons and determinations so as to fit the current acoustic model to the current speaker. Due to the burden of calculations and checks the implementation of conventional methods for recognizing speech have to be based on high performance computer systems with high capacity storage means and fast calculation units. It is an object of the present invention to provide a method for recognizing speech which allows a fast performance with a reduced burden of calculations and a particularly high recognition yield.

SUMMARY

The object is achieved by a method for recognizing speech according to the generic part of claim 1 according to the invention with the features of the characterizing part of claim 1. Preferred and advantageous embodiments of the inventive method for recognizing speech are subject of the dependent sub-claims.

The method for recognizing speech according to the present invention is characterized in that the process of recognition is started using a starting acoustic model as said current acoustic model. Further, after given numbers of performed recognition steps and/or obtained recognition results, a modified acoustic model is generated based on said current acoustic model by canceling or removing model function mixture components having a negligible contribution with respect to at least given numbers of recognition results already obtained. Additionally, the recognition process is continued-in particular with the next recognition step—using said modified acoustic model as said current acoustic model in each case.

It is therefore a basic idea of the present invention to use a starting acoustic model to cover the large variety and variability of acoustical properties of human speakers using a great number of mixtures. By removing or canceling from the current acoustic model1 model function mixture components which do not or only to a negligible extent contribute to describe or model the speaking or acoustical behavior and/or properties of the current speaker the set of model functions and in particular of model function mixtures and their components which have to be checked with respect to their contribution is reduced. If a particular model function mixture component essentially does not contribute to achieve or describe recognition results and/or to obtain a particular recognition results it is skipped. Therefore, the following recognition steps within a current recognition process are carried out without having to check these skipped model function mixture components which have been classified as being negligible in the past of the recognition process.

In comparison with prior art or conventional methods for recognizing speech the inventive method might use for a given current speaker in the very beginning of the recognition process the same acoustic model as conventional methods do. But with an increasing number of recognition results and therefore with an increasing number of recognition steps, the number of model function mixture components is reduced according to the invention, therefore, diminishing the burden of evaluating the remaining model function mixture components in the adapted current acoustic model for the following recognition steps within the current recognition process. As a result, the inventive method can be performed faster, with a less amount of storage capabilities and in particular without decreasing the recognition yield or efficiency.

In accordance with a preferred embodiment of the present invention, a modified acoustic model is repeatedly generated after each fixed and/or predetermined number of performed recognition steps and/or obtained recognition results, and in particular after each single recognition step and/or result. The number after which an adaptation of the current acoustic model is performed can therefore be chosen to balance between desired fast performance of the inventive method and an also desired highly reliable recognition on the basis of a current acoustic model which is instantaneously updated.

Instead of predetermining and/or fixing the number of recognition steps/results after which an adaptation takes place, the number of recognition steps and/or results may be determined and/or changed within the process of recognition and/or adaptation in accordance with a particular preferred embodiment of the present invention.

According to a preferred embodiment of the inventive method an acoustic model is used- in particular as said starting acoustic model and/or as said current acoustic model in each case—in which the model function mixture at least contains distribution functions or the like. In particular, functions of the Gaussian type or the like are preferred as they are appropriate for modeling the acoustical properties of a speaker.

In a further advantageous embodiment of the inventive method for recognizing speech, model function mixtures are based in each case on a function vector and/or on a weight factor vector, each of which having in particular a finite and/or equal number of components. This has the particular advantage that each of the function vector components is assigned to a particular weight factor vector component describing its amplitude or contribution when modeling the acoustical behavior of the current speaker. For the different model function mixtures, an independent number of function vector or weight factor vector components might be chosen. Preferably, the number of components are the same for all model function mixtures, the function vectors and the weight factor vectors.

It is of particular advantage to give a particular simple description on how the distinct model function mixtures can be constructed. It is preferred that the model function mixtures in each case are represented as a linear combination or superposition of its vector function components weighted by its weight factor vector components. In particular, the model function mixtures can be represented by a scalar product or inner product of the weight factor vector and the function vector, in particular according to the following formula:

$$MFMj = \sum_{k=1}^{n_j} a_{j,k} f_{j,k} = a_j^T f_j = a_j \cdot f_j$$

where MFMj denotes the $j^{th}$ model function mixture, $a_j$ denotes a $J^{th}$ weight factor vector with $a_{j,k}$ being its $k^{th}$ component, $f_j$ denotes the $j^{th}$ function vector with $f_{j,k}$ being its $k^{th}$ component, $a_j^T$ denotes the transposed form of $a_j$ and denotes the scalar or inner product of the vectors. Such a structure enables an easy evaluation, calculation and construction of the model function mixtures with respect to the speaking behavior as well as the evaluation of their contribution within the current acoustic model.

BRIEF DESCRIPTION OF THE DRAWINGS

FIGURE shows a block diagram of a system used in the method for recognizing speech.

DESCRIPTION

Essential for the inventive method for recognition is the question of defining the model function mixture components and their contribution for the description of the acoustical behavior of the current speaker. According to a further preferred embodiment, a model function mixture component is classified as being negligible if the absolute value of its weight factor vector component is beyond a given threshold value. This threshold value defines the limit which has to be reached by the amplitude of a model function mixture component—i.e. the appropriate weight factor vector component—so that the distinct model function mixture component is said to contribute to the description and modeling of the acoustical behavior of the current speaker.

In general, one occurrence of a falling beyond a certain threshold value might not be sufficient for the classification as being negligible. Therefore, it is advantageous to classify a contribution as being negligible as the distinct weight factor vector component is beyond the given threshold value for a given number of times, in particular of recognition results and/or recognition steps already obtained or performed, respectively. That means that in the evaluation of the speaking behavior and the adaptation of the current acoustic model, it is checked on whether or not a number of times that a specific weight factor vector component falls beyond a given threshold value exceeds a given number of times.

Further, it could be necessary to distinguish cases in which the occasions of falling beyond the given threshold value are separated by a given number of occasions where the model function mixture component contributes to the description and modeling of the speaking behavior of the current speaker. The occurrence of point or single occasions might in some cases not lead to a classification as being negligible. In these cases, the classification of being negligible might be given if the occasions of falling beyond the given threshold values are connected or correlated.

In a further preferred embodiment of the inventive method for recognizing speech, the threshold values are predetermined, in particular before starting the recognition process and/or in particular for each of said model function mixture components independently. This measure enables a particular design of the starting acoustic model and the behavior of the model during its adaptation and evaluation. Some of the model function mixture components or the model function mixtures might be evaluated in a special way on the basis of a particular set of threshold values.

During the process of adaptation and evaluation of the current acoustic model, it might be necessary to adjust, to determine and/or to modify the threshold values during the recognition process instead of keeping them fixed. The adaptation and modification of the threshold values might in particular be based on signal quality information with respect to the incoming speech flow and further in particular with respect to specific statistical and/or noise data.

The invention can further be summarized as follows:

Conventionally, speaker adaptation methods transform an underlying acoustic model of a speech recognizer or a speech recognition method so that they do better fit to the acoustic properties and the speaking behavior of a current speaker. The basis for the acoustic model is a large set of model function mixtures, in particular of the Gaussian type. A large number of such model function mixtures is necessary to capture and to cover the large acoustic variability with respect to spoken phonemes, phones, syllables, words, subword units or the like.

Although, according to the way described above, conventional methods for recognizing speech can deal at least in part with said large variability of speaking behavior. They suffer from the large number of model function mixtures and their components which have to be evaluated each time during a current recognition process, even if they are not necessary for the description of the current speaker. After several adaptation steps the models are shaped so as to better match the new speakers' acoustic properties. So the models are more tailored for this one particular speaker. This means that it is no longer necessary to use many mixtures, since the variability then is smaller. This is implicitly expressed by the fact that for the mixtures contributions to this speaker the weights will be higher.

Therefore, the inventive method proposes to reduce the number of model function mixtures and model function mixture components being contained in the current acoustic model to the number of such model function mixture components which are indeed necessary for the description of the current speaker. This saves performance time, making the performance faster and also reduces the burden of storage capabilities.

After adaptation to the current speaker, the large variability of the current acoustic model, in particular of the starting acoustic model, with respect to all possible speakers is not necessary anymore, Therefore, a smaller number of model function mixtures and model function mixture components within an adapted acoustic model as said current model is completely sufficient for the description and the modeling of the current speaker; Only these model function mixture components are kept within the adaptation process and are necessary for obtaining correct recognition results.

For model function mixture components, e.g. for Gaussians or the like, which are frequently observed in the recognition process or in the speech signal—i. e. which do match best in the past recognition steps, obtained recognition results or observed speech frames—the mixture weights or weight factor vector components are slowly increased. For other model function mixture components which are not observed, the weight factor vector components are decreased. If such a mixture weight of a model function mixture component falls below the above-described threshold, said model function mixture component is discarded. Therefore, it will not be evaluated in the future. Consequently, performance time and memory are saved.

In the following, the inventive method for recognizing speech will be described in more detail on the basis of a preferred embodiment taking reference to the accompanying Figure describing said preferred embodiment by means of a block diagram.

The block diagram of the FIGURE shows a preferred embodiment of the inventive method 10 for recognizing speech.

In a first step 11 a speech signal is received from the current speaker and is preprocessed. The speech signal which may be a part of a continuously received speech flow is then fed to the core of the speech recognition process 12 from which a recognition result is obtained in step 13. From the step of recognition 12 and from the result of the recognition 13 a step 14 of online speaker adaptation is initiated. During that online speaker adaptation 14, the mean vectors, variances and mixture weights $a_j$, i.e. the weight factor vector components $a_j$ of the Gaussian mixtures, are modified.

In the next step 15, the mixture weights $a_j$ are evaluated in particular with respect to recognition steps 12 of the current recognition process already performed. During the evaluation, Gaussians or in general model function mixture components are discarded and removed from the current acoustic model which have weight factor vector $a_{j,k}$ below a given threshold $C_{j,k}$.

In the following step 16, the remaining weight factor vector components are normalized to give summarized the value 1 for each model function mixture.

In the next step 17, the internal structure and data of the current acoustic model CAM is adapted and updated, including the internal data structure of hidden Markov models or the like, so as to form a modified acoustic model MAM.

In the following step 18, the current model CAM is set to the modified acoustic model MAM of step 17. In step 19, finally, the current acoustic model CAM is prepared to rule the next recognition step 12 of the recognition process 10.

According to a further preferred embodiment of the invention weight factor vector components $a_{j,k}$ are modified among other components of the modified acoustic model MAM for speaker adaptation, in particular to reduce certain weight factor vector components $a_{j,k}$ below certain thresholds.

The invention claimed is:

1. Method for recognizing speech,
   wherein, for the process of recognition, a current acoustic model (CAM) based on a set of model function mixtures (MFM1, . . . , MFMn) is used, and
   wherein said current acoustic model (CAM) is adapted during the recognition process by changing at least in part the contributions of model function mixture components (MFMjk) of model function mixtures (MFMj) based on at least one recognition result already obtained,
   characterized in that
   the process of recognition is started using a starting acoustic model (SAM) as said current acoustic model (CAM),
   after a given number of performed recognition steps and/or after a given number of obtained recognition results, a modified acoustic model (MAM) is generated based on said current acoustic model (CAM) by canceling model function mixture components (MFMjk) having negligible contributions with respect to at least a given number of recognition results already obtained, and
   the process of recognition is continued using said modified acoustic model (MAM) as said current acoustic model (CAM) in each case.

2. Method according to claim 1,
   wherein a modified acoustic model (MAM) is generated repeatedly after each fixed and/or predetermined number of performed recognition steps and/or obtained recognition results, in particular after each single performed recognition step and/or obtained recognition result.

3. Method according to claim 1,
   wherein the number of recognition steps and/or recognition results after which a modified acoustic model (MAM) is generated is determined and/or changed within the current process of recognition and/or adaptation.

4. Method according to claim 1,
   wherein an acoustic model is used—in particular as said starting acoustic model (SAM) and/or as said current acoustic model (CAM) in each case—the model function mixtures (MFMj) of which at least contain distribution functions or the like, in particular functions of the Gaussian type or the like and/or in particular as said model function mixture components (MFMjk).

5. Method according to claim 1,
   wherein each of said model function mixtures (MFMj) is based on a function vector ($f_j$) and a weight factor vector ($a_j$), each of which having a finite and/or equal number ($n_j$) of components.

6. Method according to claim 5,
   wherein each of said model function mixtures (MFMj) is a linear combination or superposition of its vector function components ($f_{j,k}$) weighted by its weight factor vector components ($a_{j,k}$), particularly represented by a scalar product of the weight factor vector ($a_j$) and the function vector ($f_j$):

$$MFMj = \sum_{k=1}^{n_j} a_{j,k} f_{j,k} = a_j^T f_j = a_j \cdot f_j$$

where MFMj denotes the $j^{th}$ model function mixture, $a_j$ denotes a $j^{th}$ weight factor vector with $a_{j,k}$ being its $k^{th}$ component, $f_j$ denotes the $j^{th}$ function vector with $f_{j,k}$ being its $k^{th}$ component, $a_j^T$ denotes the transposed form of $a_j$ and denotes the scalar or inner product of the vectors.

7. Method according to claim 5,
wherein each of said model function mixture components (MFMjk) is classified as being negligible if the absolute value ($|a_{j,k}|$) of its weight factor vector component ($a_{j,k}$) is beyond a given threshold value ($c_{j,k}$), in particular for a given number ($m_{j,k}$) of times of recognition steps already performed and/or recognition results already obtained.

8. Method according to claim 7,
wherein each of said threshold values ($c_{j,k}$) is predetermined and/or fixed, in particular for each of the model function mixture components (MFMjk) independently and in particular before starting the recognition process.

9. Method according to claim 7,
wherein each of said threshold value ($c_{j,k}$) is determined and/or modified during the recognition process, in particular based on signal quality information of the speech input and/or in particular with respect to statistical and/or noise data.

10. Method according to claim 1,
wherein weight factor vector components ($a_{j,k}$) are modified among other components of the modified acoustic model (MAM) for speaker adaptation, in particular to reduce certain weight factor vector components ($a_{j,k}$) below certain thresholds.

\* \* \* \* \*